(12) United States Patent
Shoshany

(10) Patent No.: US 6,932,863 B2
(45) Date of Patent: Aug. 23, 2005

(54) GYPSUM PRODUCT AND METHOD THEREFOR

(76) Inventor: Haggai Shoshany, PO Box 400, Kfar Tayor, 15241 (IL)

( * ) Notice: Subject to any disclaimer, the term of this patent is extended or adjusted under 35 U.S.C. 154(b) by 191 days.

(21) Appl. No.: 10/288,314

(22) Filed: Nov. 6, 2002

(65) Prior Publication Data

US 2004/0083927 A1 May 6, 2004

(51) Int. Cl.⁷ .............................. C04B 11/00
(52) U.S. Cl. ................ 106/772; 106/776; 106/781; 106/2
(58) Field of Search ............... 106/722, 776, 106/781, 2, 778, 779

(56) References Cited

U.S. PATENT DOCUMENTS

| | | | | |
|---|---|---|---|---|
| 2,198,776 A | * | 4/1940 | King et al. ............... 428/486 |
| 3,869,415 A | * | 3/1975 | Williams .................... 524/2 |
| 3,935,021 A | * | 1/1976 | Greve et al. |
| 4,042,409 A | * | 8/1977 | Terada et al. |
| 4,239,716 A | * | 12/1980 | Ishida et al. ................. 264/86 |
| 4,341,560 A | * | 7/1982 | Saito et al. ................... 524/5 |
| 4,371,399 A | * | 2/1983 | May et al. ................ 106/781 |
| 4,411,701 A | * | 10/1983 | Saito et al. ................... 524/5 |
| 4,411,702 A | * | 10/1983 | Makino et al. ............ 106/781 |
| 5,135,805 A | * | 8/1992 | Sellers et al. .............. 442/386 |
| 5,437,722 A | * | 8/1995 | Borenstein ................ 106/778 |
| 5,624,481 A | * | 4/1997 | Gerhardinger et al. ........ 106/2 |
| 5,626,668 A | * | 5/1997 | Gerhardinger et al. ..... 106/781 |
| 5,695,553 A | * | 12/1997 | Claret et al. .............. 106/778 |
| 5,749,964 A | * | 5/1998 | Mann ....................... 106/805 |
| 5,776,245 A | * | 7/1998 | Thomas .................. 106/287.1 |
| 5,855,667 A | * | 1/1999 | Thomas .................... 106/781 |
| 5,968,237 A | * | 10/1999 | Sinnige ....................... 106/2 |
| 6,010,596 A | * | 1/2000 | Song ........................ 162/158 |
| 6,165,261 A | * | 12/2000 | Wantling .................. 106/778 |
| 6,547,874 B2 | * | 4/2003 | Eck et al. .................. 106/772 |
| 6,585,820 B2 | * | 7/2003 | Wantling et al. ........... 106/271 |
| 6,663,707 B2 | * | 12/2003 | Wantling et al. ........... 106/778 |
| 6,673,144 B2 | * | 1/2004 | Immordino, Jr. et al. ... 106/778 |

FOREIGN PATENT DOCUMENTS

| | | |
|---|---|---|
| BE | 334460 | 6/1926 |
| DE | 2604483 | * 8/1976 |
| JP | 53147720 | * 12/1978 |

\* cited by examiner

*Primary Examiner*—Paul Marcantoni
(74) *Attorney, Agent, or Firm*—Dekel Patent Ltd.; David Klein

(57) ABSTRACT

A method for making a gypsum product water resistant, the method comprising adding a suspension of a hydrophobic substance to a gypsum slurry.

15 Claims, 1 Drawing Sheet

GYPSUM PRODUCT AND METHOD THEREFOR

FIELD OF THE INVENTION

The present invention relates generally to gypsum products, and particularly to a method and system for making a gypsum product water resistant, such as with the addition of a suspension into the production line of the gypsum product.

BACKGROUND OF THE INVENTION

Gypsum (calcium sulfate dihydrate or hemihydrate) is a well-known material used in making industrial and building products, especially gypsum wallboard. It is a plentiful and generally inexpensive raw material, which, through a process of hydration may turn into slurry, which may be cast, molded or otherwise formed to useful shapes, and dried to a final product. Gypsum wallboard generally consists of a rehydrated gypsum core sandwiched between multi-ply paper cover sheets, and is used largely for interior wall and ceiling applications.

However, gypsum products, e.g., wallboard, tile, block, casts and the like, have relatively little resistance to water. When ordinary gypsum wallboard, for example, is immersed in water, the board may quickly absorb a considerable amount of water, lose a great deal of its strength, and distort or swell in different places. Many attempts have been made in the past to improve the water resistance of gypsum products by adding waterproofing materials within the gypsum slurry. The most common waterproofing material in use today is a hydrophobic emulsion, usually an emulsion of wax, paraffin, asphalt or a silicone compound, e.g., silanes and siloxanes.

It is important to define clearly the difference between an emulsion and a suspension. An emulsion is defined as a dispersion of one liquid in a second immiscible liquid. One well-known example of an emulsion is milk; another is certain kinds of paint. A suspension, on the other hand, is defined as a dispersion of fine solid or liquid particles in a fluid (liquid or gas), the particles being supported by buoyancy.

Some emulsified silicone compositions used to make gypsum products water repellent may contain an emulsion of polysiloxane and some parts by weight of a liquid suspension of colloidal silica and other parts by weight of an emulsifier stabilizer. However, the silicone composition that is actually added to the gypsum slurry is an emulsion, not a suspension.

Other methods have been proposed in the prior art to improve the water resistance of gypsum products by coating the finished gypsum product with water resistant films or coatings. Another method involves spraying molten paraffin, wax, asphalt, and the like, into the aqueous gypsum slurry.

SUMMARY OF THE INVENTION

The present invention seeks to provide an improved gypsum product and process therefor. In the present invention, contrary to the prior art, the gypsum product is made by adding a suspension of a hydrophobic (that is, water repelling or resisting, the terms being used interchangeably) substance, such as but not limited to, paraffin, wax and the like. Adding a hydrophobic suspension to the gypsum slurry may provide several advantages Emulsions have to be stored at the site where the gypsum product is produced, and have a limited shelf life. The manufacture of emulsions uses a lot of energy and is relatively costly. In contrast, the raw materials for making the suspension are much cheaper and are much more stable. Production of certain water repellent suspensions requires heat. The suspension may be manufactured at the site where the gypsum product is produced. The excess heat of the gypsum production process may be used as part of the manufacturing process of the suspension. Making the suspension at the site where the gypsum product is produced, and introducing the suspension on-line to the gypsum slurry, may provide significant savings in energy, storage, manpower, etc.

There is thus provided in accordance with an embodiment of the present invention a method for making a gypsum product water resistant, the method comprising adding a suspension of a hydrophobic substance to a gypsum slurry.

In accordance with an embodiment of the present invention the suspension is added to the gypsum slurry on-line at a production line where a gypsum product is produced.

Further in accordance with an embodiment of the present invention, the hydrophobic substance may be stored in a first storage container, a liquid may be stored in a second storage container, and the suspension may be formed by dispersing the hydrophobic substance in the liquid in a mixing device.

Still further in accordance with an embodiment of the present invention the suspension may be added directly from the mixing device to the gypsum slurry.

In accordance with another embodiment of the present invention the suspension may be fed from the mixing device to an auxiliary mixing device, and the suspension may be added from the auxiliary mixing device to the gypsum slurry.

Further in accordance with an embodiment of the present invention the flow of the suspension to the gypsum slurry may be controlled with a control feeder valve.

Still further in accordance with an embodiment of the present invention the suspension may be added to the gypsum slurry in a production line, and the production line and the control feeder valve may operate in a closed control loop.

BRIEF DESCRIPTION OF THE DRAWINGS

The present invention will be understood and appreciated more fully from the following detailed description taken in conjunction with the drawing in which.

DETAILED DESCRIPTION OF THE PREFERRED EMBODIMENT

Figure 1:
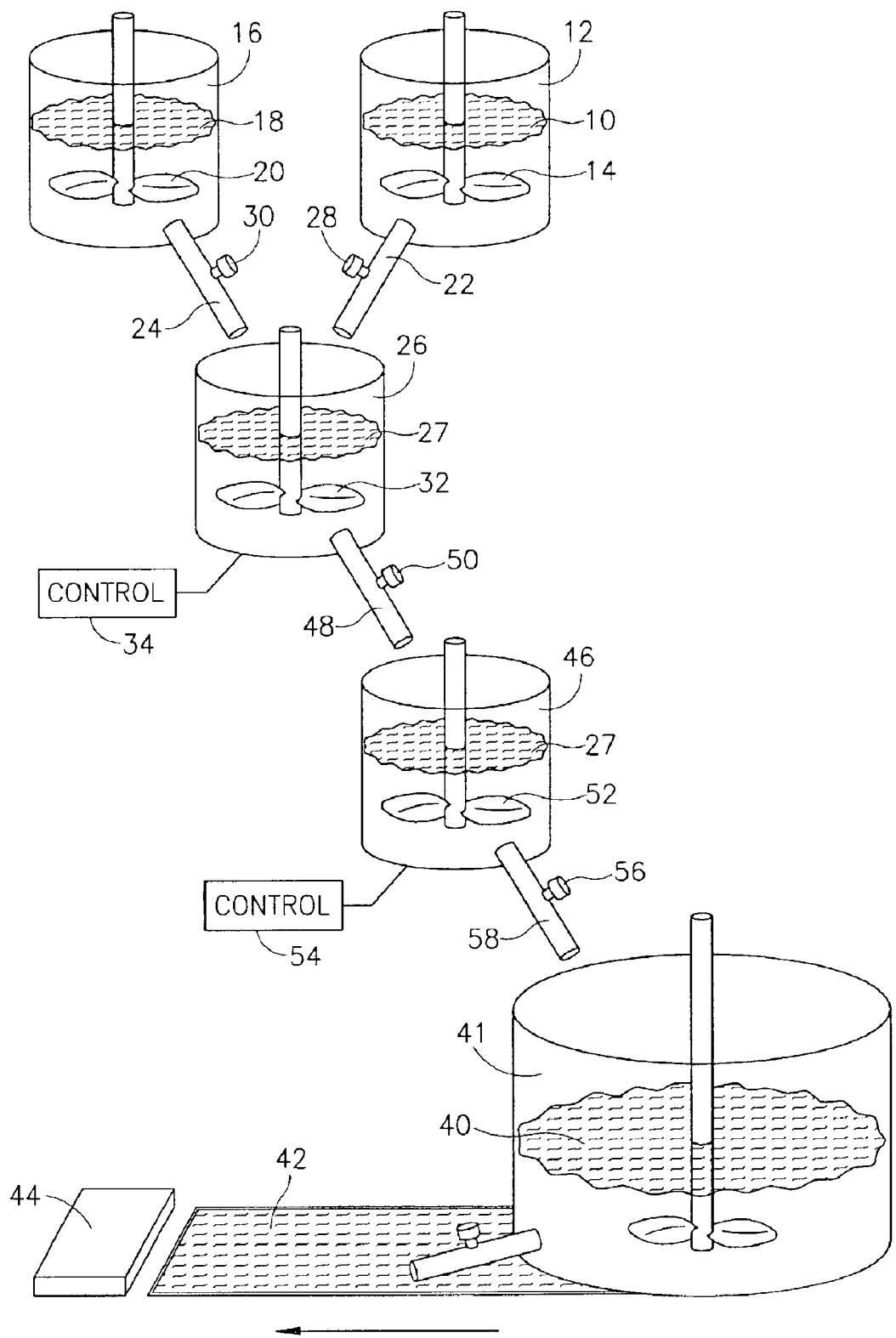
FIG. 1 is a simplified block diagram of a method and system for making a gypsum product water resistant, in accordance with an embodiment of the present invention.

Reference is now made to FIG. 1, which illustrates a method and system for making a gypsum product water resistant, in accordance with an embodiment of the present invention.

A hydrophobic substance 10, such as but not limited to paraffin, wax, asphalt and the like or any combination thereof, may be stored in a storage container 12. Hydrophobic substance 10 may be in the form of liquid, particles, flakes, pellets and other shapes, of any size. Storage container 12 may comprise a mixer 14. Dispersing aids (not shown) may be added to hydrophobic substance 10 in storage container 12. Mixer 14 may be used to reduce hydrophobic substance 10 to particles of any desired size. Provision may be made for controlling the temperature of the contents of storage container 12, such as, but not limited to, to a temperature range of 60–98° C.

Another storage container 16 may be provided for storing therein a liquid 18, such as but not limited to, water, which will be used to disperse therein hydrophobic substance 10 to form a suspension. Storage container 16 may also comprise a mixer 20. Dispersing aids (not shown) may be added to liquid 18 in container 16. Provision may be made for controlling the temperature of the contents of storage container 16, such as, but not limited to, to a temperature range of 60–98° C.

The contents, or any portion thereof, of storage containers 12 and 16 may be fed via tubing 22 and 24, respectively, to a batch mixing device 26, where hydrophobic substance 10 is dispersed in liquid 18 to form a suspension 27. Control valves 28 and 30, respectively, may control the flow of material from storage containers 12 and 16 to batch mixing device 26. Batch mixing device 26 may comprise a mixer 32, which may be any suitable dispersing mixer, such as but not limited to, a propeller, a stirrer, or dissolver moving at any suitable rate to form or maintain suspension 27. A control unit 34 may be provided that controls operation of batch mixing device 26, such as but not limited to, the weight or volume of the substances being mixed, the pressure or temperature of batch mixing device 26, and the time duration of mixing. Dispersing aids (not shown) may be added to the suspension in storage container 26. Provision may be made for controlling the temperature of the contents of storage container 16, such as but not limited to, to a temperature range of 60–98° C.

Suspension 27 may be added directly, if desired, from batch mixing device 26 to a gypsum slurry mixer 41. Gypsum slurry 40 may flow along a production line 42 for making a gypsum product 44, such as but not limited to, pre-cast gypsum products, e.g., wallboard, tile, block, casts and the like. The addition of suspension 27 may impart water resistance to the final gypsum product 44. The amount of suspension 27 added to gypsum slurry 40 and the rate of its addition thereto may be functions of various factors, such as but not limited to, the speed of the production line 42, the type of the gypsum product, the desired quality or thickness or other property of the product, the ratio of hydrophobic substance 10 to liquid 18 in suspension 27, etc. A control process feeder valve 50 may control the flow of suspension 27 to the gypsum slurry mixer 41 in production line 42. The production line 42 and control process feeder valve 50 may operate in a closed control loop, wherein the rate of production line 42 automatically controls the feeding of suspension 27 to gypsum slurry mixer 41.

Instead of adding suspension 27 directly from batch mixing device 26 to gypsum slurry 40, suspension 27 may first flow from batch mixing device 26 to an auxiliary mixing device 46 via tubing 48. A control batch feeder valve 50 may control the flow of material from batch mixing device 26 to auxiliary mixing device 46. Auxiliary mixing device 46 may also comprise a mixer 52, which may be any suitable dispersing mixer, such as but not limited to, a propeller, stirrer, or dissolver moving at any suitable rate to form or maintain suspension 27. Provision may be made for controlling the temperature of the contents of storage container 16, such as but not limited to, to a temperature range of 30–98° C. A control unit 54 may be provided that controls operation of auxiliary mixing device 46, such as but not limited to, the weight or volume of the substances being mixed, the pressure or temperature of auxiliary mixing device 46, and the time duration of mixing. A control process feeder valve 56 may control the flow of suspension 27, via tubing 58, to the gypsum slurry mixer 41 in production line 42. The production line 42 and control process feeder valves 50 and 56 may operate in a closed control loop, wherein the rate of the production line 42 automatically controls the production and feeding of suspension 27 to gypsum slurry mixer 41.

It is noted that any of the mixing devices (e.g., "batch" or "auxiliary") may comprise provision for mixing discrete batches or continuous mixing of substances.

It will be appreciated by person skilled in the art that the present invention is not limited by what has been particularly shown and described herein above. Rather the scope of the present invention is defined only by the claims that follow:

What is claimed is:

1. A method for making a gypsum product water resistant, the method comprising:

adding a wax suspension to a gypsum slurry.

2. The method according to claim 1, wherein said wax suspension is added to said gypsum slurry on-line at a production line where a gypsum product is produced.

3. The method according to claim 1, wherein said wax suspension is manufactured at a site where the gypsum product is produced.

4. The method according to claim 3, wherein excess heat of producing the gypsum product is used as part of manufacturing said wax suspension.

5. The method according to claim 1, further comprising storing wax in a first storage container, storing a liquid in a second storage container, and forming said wax suspension by dispersing said wax in said liquid in a mixing device.

6. The method according to claim 1, wherein said wax suspension is added directly from said mixing device to said gypsum slurry.

7. The method according to claim 1, wherein said wax suspension is fed from said mixing device to an auxiliary mixing device, and said wax suspension is added from said auxiliary mixing device to said gypsum slurry.

8. The method according to claim 6, further comprising controlling flow of said wax suspension to said gypsum slurry with a control feeder valve.

9. The method according to claim 7, further comprising controlling flow of said wax suspension to said gypsum slurry with a control feeder valve.

10. The method according to claim 8, comprising producing and adding said wax suspension to said gypsum slurry in a production line, wherein said production line and said control feeder valve operate in a closed control loop.

11. The method according to claim 9, comprising producing and adding said wax suspension to said gypsum slurry in a production line, wherein said production line and said control feeder valve operate in a closed control loop.

12. The method according to claim 1, further comprising preparing the wax suspension at the gypsum production line.

13. The method according to claim 2, further comprising preparing the wax suspension at the gypsum production line.

14. The method according to claim 6, further comprising controlling production of said wax suspension to said gypsum slurry with a control feeder valve.

15. The method according to claim 7, further comprising controlling production of said wax suspension to said gypsum slurry with a control feeder valve.

* * * * *